United States Patent
Carbone et al.

(10) Patent No.: US 7,675,984 B1
(45) Date of Patent: Mar. 9, 2010

(54) LOW COMPLEXITY, ITERATIVE APPROACH TO ACTIVE INTERFERENCE CANCELLATION

(75) Inventors: Nick Carbone, San Diego, CA (US); Tim Gallagher, Encinitas, CA (US)

(73) Assignee: Staccato Communications, Inc., San Diego, CA (US)

( * ) Notice: Subject to any disclaimer, the term of this patent is extended or adjusted under 35 U.S.C. 154(b) by 778 days.

(21) Appl. No.: 11/480,314

(22) Filed: Jun. 30, 2006

(51) Int. Cl.
*H04K 1/10* (2006.01)

(52) U.S. Cl. .................. 375/260; 375/346; 375/254; 455/114.2

(58) Field of Classification Search .............. 375/260, 375/254, 346; 455/114.2
See application file for complete search history.

(56) References Cited

U.S. PATENT DOCUMENTS

2006/0008016 A1 * 1/2006 Balakrishnan et al. ...... 375/260
2006/0008017 A1   1/2006 Balakrishnan et al.

OTHER PUBLICATIONS

Walter Gander. "Least Squares with a Quadratic Constraint." Numerische. Mathematik, 1981. pp. 291-307. Neu-Technikum, Buchs, Switzerland.
Golub and Van Loan, "Special Topics." Chapter 12. pp. 579-583.
Hirohisa Yamaguchi. "Active Interference Cancellation Technique for MB-OFDM Cognitive Radio." Texas Instruments, Tsukuba Technology Center, Japan.

* cited by examiner

*Primary Examiner*—Mohammad H Ghayour
*Assistant Examiner*—Leila Malek
(74) *Attorney, Agent, or Firm*—Van Pelt, Yi & James LLP

(57) ABSTRACT

Generating a notch in an Orthogonal Frequency Division Multiplexing (OFDM) frequency spectrum includes determining a first active interference cancellation (AIC) tone, comparing the first AIC tone with an amplitude limit, in the event that the first AIC tone exceeds the amplitude limit, constraining the first AIC tone, and determining a second AIC tone based at least in part on the first AIC tone. An Active Interference Cancellation (AIC) tone generator includes an interface configured to receive a plurality of tones, a processing component coupled to the interface, configured to determine a first AIC tone, compare the first AIC tone with an amplitude limit, and in the event that the first AIC tone exceeds the amplitude limit, constrain the first AIC tone, and determine a second AIC tone based at least in part on the first AIC tone.

17 Claims, 9 Drawing Sheets

|  | 2 AIC edge tones | 4 AIC edge tones (Incremental Complexity) | 6 AIC edge tones (Incremental Complexity) |
| --- | --- | --- | --- |
| Traditional Full Matrix Compute all AIC Tones | Store 128 x n W2 matrix 128 x n multiplies (128-1) x n adds | Store 128 x n-2 W2 matrix 128 x n-2 multiplies (128-1) x n-2 adds | Store 128 x n-4 W2 matrix 128 x n-4 multiplies (128-1) x n-4 adds |
| Iterative procedure according to process 400 | Store 128 x n W2 matrix 128 x 2 multiplies (128-1) x 2 adds | Store 128 x n-2 W2 matrix 128 x 2 multiplies (128-1) x 2 adds | Store 128 x n-4 W2 matrix 128 x 2 multiplies (128-1) x 2 adds |
| Iterative procedure according to process 600, using Equation 4 for $C_{norm}$ | Store 128 x n W2 matrix 128 x 2 multiplies (128-1) x 2 adds | 2*n-1 sums 3 multiplies | 2*n-1 sums 3 multiplies |
| Iterative procedure according to process 600, using a constant approximation value for $C_{norm}$ | Store 128 x n W2 matrix 128 x 2 multiplies (128-1) x 2 adds | 2 multiplies | 2 multiplies |

FIG. 9

LOW COMPLEXITY, ITERATIVE APPROACH TO ACTIVE INTERFERENCE CANCELLATION

BACKGROUND OF THE INVENTION

Ultra Wide Band (UWB) devices are designed to operate wirelessly at low signal levels over a wide frequency range, without interfering with other devices or services. Typically, the modulation scheme used by UWB devices is Orthogonal Frequency Division Modulation (OFDM), in which multiple subcarriers (sometimes referred to as tones) orthogonal to each other are used for modulating data.

The amount of transmission power allowed by UWB devices is usually restricted by government regulation. For example, in the United States, the FCC approved a limit of –41.3 dBm/MHz in the frequency band of 3.1-10.6 GHz. Thus, industry standards such as the WiMedia™ Specification follow the limitation and require devices to be designed to operate at or below the limit. FIG. 1A illustrates the power spectrum of a UWB device that has a flat transmission power spectrum. The center frequencies of the tones are shown for purposes of simplicity. In practice, the tones have a sin(f)/f profile.

In other countries or regions, however, different regulations may lead to different requirements. For example, in Europe and Japan, UWB devices may be restricted to a maximum transmit power of –70 dBm/MHz for certain frequency regions to avoid interfering with devices implementing other standards. FIG. 1B illustrates an ideal power spectrum of a UWB device that meets the lower transmission requirement in a specific frequency region.

To achieve a lower transmit power level in certain frequency ranges, UWB transmitters can be designed to turn off completely in these frequency ranges (or UWB frequency bands that contain the frequency ranges). This, however, will typically compromise the performance of the UWB devices since the devices will likely be forced to operate in alternative bands, thus limiting the total integrated transmit power, decreasing the number of simultaneously operating piconets, and reducing overall capacity.

Alternatively, the UWB transmitters can be designed to transmit at or below the specified lower power level in the designated frequency ranges, while maintaining their normal transmit power level for the rest of the frequency spectrum. For example, a WiMedia UWB transmitter can transmits at a power level of –41.3 dBm/MHz or less in most of the frequency spectrum, but at –70 dBm/MHz or less in frequency ranges shared by WIMAX or 4G devices. The power reduction can be achieved by generating a notch in the spectrum in specific frequency ranges. An ideal notch in the spectrum is shown in FIG. 1B.

In practice, generating a deep notch in the spectrum is a non-trivial matter because of the side lobes generated by OFDM tones in the frequency domain. Turning off tones with frequencies that fall within the notch nulls the effects of these tones. Tones centered at neighboring frequencies, however, contain power at other frequencies and contribute power within the notch. FIG. 1C illustrates the power contribution made by neighboring tones. As shown in this example, neighboring tones such as 102-106 have power profiles according to the functions sin(f)/f (shown in dashed lines). The side lobes of these tones fill the notch spectrum at various places, forming spurious signals (also referred to as residual tones) such as 108 and 110. The resulting power level inside the notch can exceed the required maximum due to the power contained in the residual tones.

In "Active Interference Cancellation Technique for MB-OFDM Cognitive Radio", Yamaguchi introduced a method of generating a deep notch in the spectrum. According to this method, Active Interference Cancellation (AIC) tones are placed at the edges of the null region, and the amplitude and phase are calculated to cancel out the interference from other tones. In this way, nulls of depth –70 dBm/MHz or greater can be generated. The drawback of this method is that the resulting AIC tones may be of greater amplitude than the neighboring tones, therefore the entire band may have to be reduced to keep the large AIC tones below the –41.3 dBmi/MHz limit. This problem is illustrated in FIG. 1D, where the AIC tone pair 120 and 122 have greater amplitudes than data tones such as 124-130. In some cases, to remedy the large AIC tone, the average transmit power is reduced by 5-10 dB, and consequently the performance of the transmitter is also degraded. It would be desirable to have a way to cancel the interference without significantly reducing the performance of the transmitter.

Further, existing techniques for determining AICs are often computationally intensive, therefore costly to implement in hardware such as Application Specific Integrated Circuit (ASIC). It would also be useful to have an interference cancellation technique that is less computationally intensive and can be more easily implemented in hardware.

BRIEF DESCRIPTION OF THE DRAWINGS

Various embodiments of the invention are disclosed in the following detailed description and the accompanying drawings.

FIG. 9 is a table illustrating the complexity estimates for various approaches to computing the AIC tones.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a notch in an OFDM spectrum is disclosed. In some embodiments, one or more AIC tones are generated and compared with an amplitude limit. In the event that that a first AIC tone generated exceeds the amplitude limit, the AIC tone is constrained, and a second AIC tone based at least in part on the first AIC tone is determined. More AIC tones may be determined iteratively until the unconstrained AIC tone meets the amplitude limit.

Figure 1A:
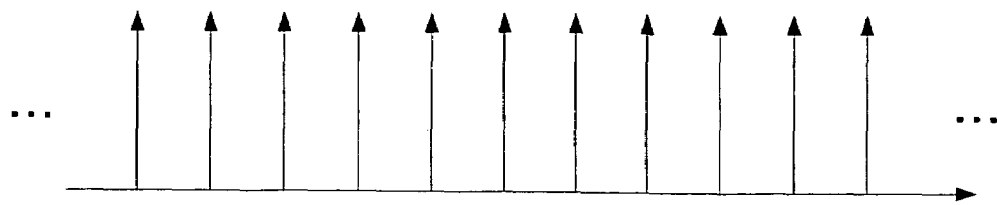
FIG. 1A illustrates the power spectrum of a UWB device that has a flat transmission power spectrum.
Figure 1B:
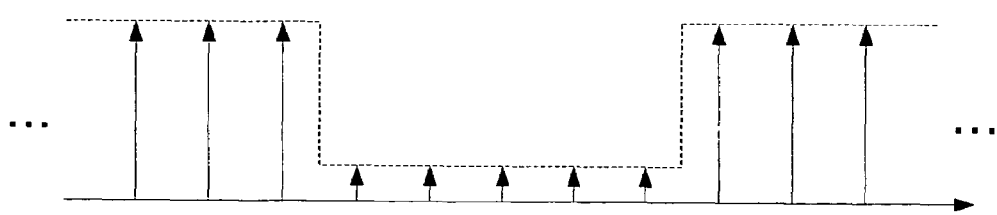
FIG. 1B illustrates an ideal power spectrum of a UWB device that meets the lower transmission requirement in a specific frequency region.
Figure 1C:
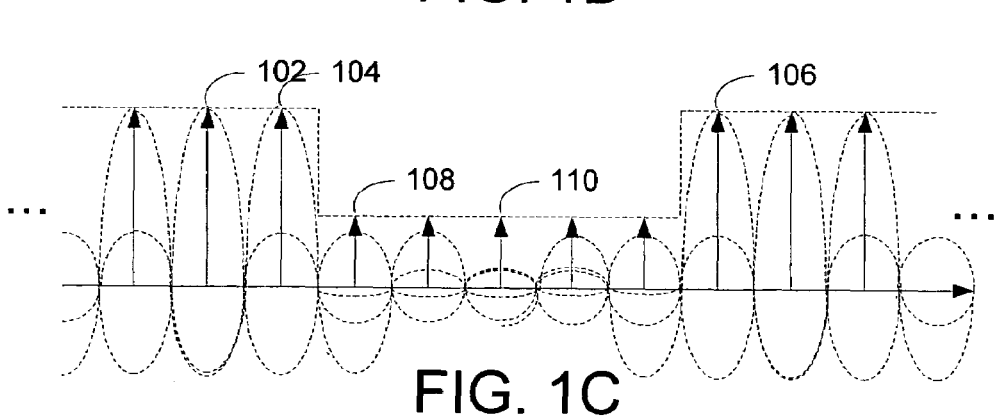
FIG. 1C illustrates the power contribution made by neighboring tones.
Figure 1D:
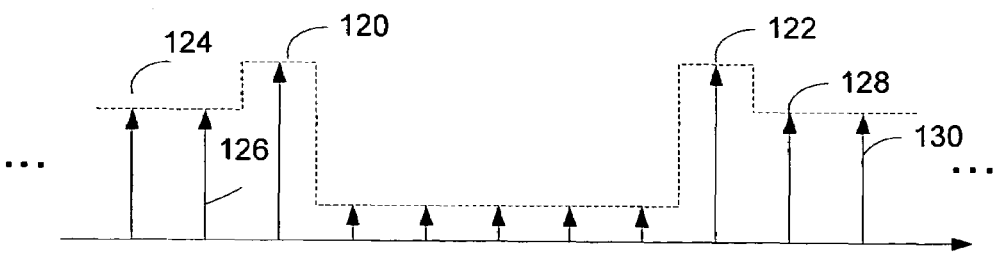
FIG. 1D illustrates a problem associated with a traditional AIC cancellation technique.
Figure 2:
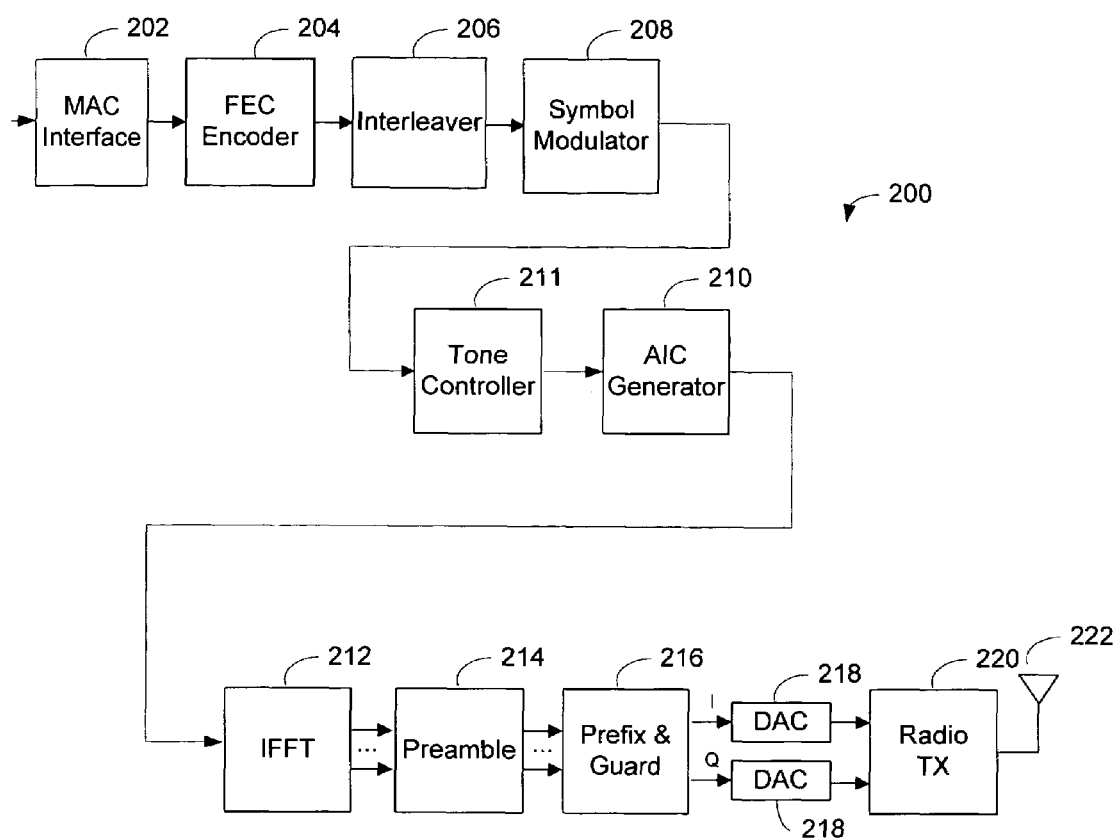
FIG. 2 is a block diagram illustrating a transmitter embodiment.

FIG. 2 is a block diagram illustrating a transmitter embodiment. In this example, transmitter 200 is an OFDM based UWB transmitter. It is capable of producing a desired frequency spectrum with one or more notches in one or more specified frequency ranges. Input data to transmitter 200 is sent via a media access controller (MAC) interface 202 to a forward error correction (FEC) encoder 204 to be encoded. An optional interleaver 206 interleaves the encoded bits to provide better protection against multipath and interference. The bits are then mapped to modulation symbols by a symbol modulator 208. A modulation scheme such as quadrature phase shift keying (QPSK) is employed. The modulation symbols are assigned to subcarriers, creating a relatively flat frequency spectrum similar to the example shown in FIG. 1A.

A tone controller 211 controls the outputs of the symbol modulator, turning data tones in the notch region off and on as required. The output of the tone controller is sent to an AIC tone generator 210. The AIC tone generator includes an interface for receiving input tones, and a processing component for generating the AIC tones used to cancel the residual tones in the notch region. The processing component may be implemented using one or more programmable signal processors, ASICs, general purpose processors, or the like. In this example, the AIC generator determines the amplitude and phase of one or more AIC tones. Details of the AIC generator's operations are discussed below. The tone controller and the AIC generator may be selectively enabled and disabled. For example, if it is detected that the transmitter it is operating in an environment conforming to the U.S. spectrum requirement, the tone controller and the AIC generator are disabled so that the symbol modulator's output is unchanged. If, however, it is detected that the transmitter is operating in an environment that conforms to the European or Japanese spectrum requirement, the tone controller and the AIC generator are enabled. Although the tone controller and the AIC generator are shown as separate blocks in the example shown, their functions can be combined into a single module.

The AIC tone compensated signals are sent to IFFT module 212. The IFFT module is used to transfer blocks of symbols into a time domain waveform (also referred to as an OFDM symbol). A preamble is optionally added to the OFDM symbol by preamble module 214. In some embodiments, a guard interval, a cyclic prefix, and/or a zero prefix are added to the OFDM symbol by module 216. In some embodiments, interpolation and amplitude clipping are optionally applied to the OFDM symbol. The inphase (I) and quadrature (Q) components of the baseband OFDM signal are converted from digital to analog by digital to analog converters 218. The analog signals are sent to a radio transmitter 220 to be transmitted via antenna 222.

Figure 3:
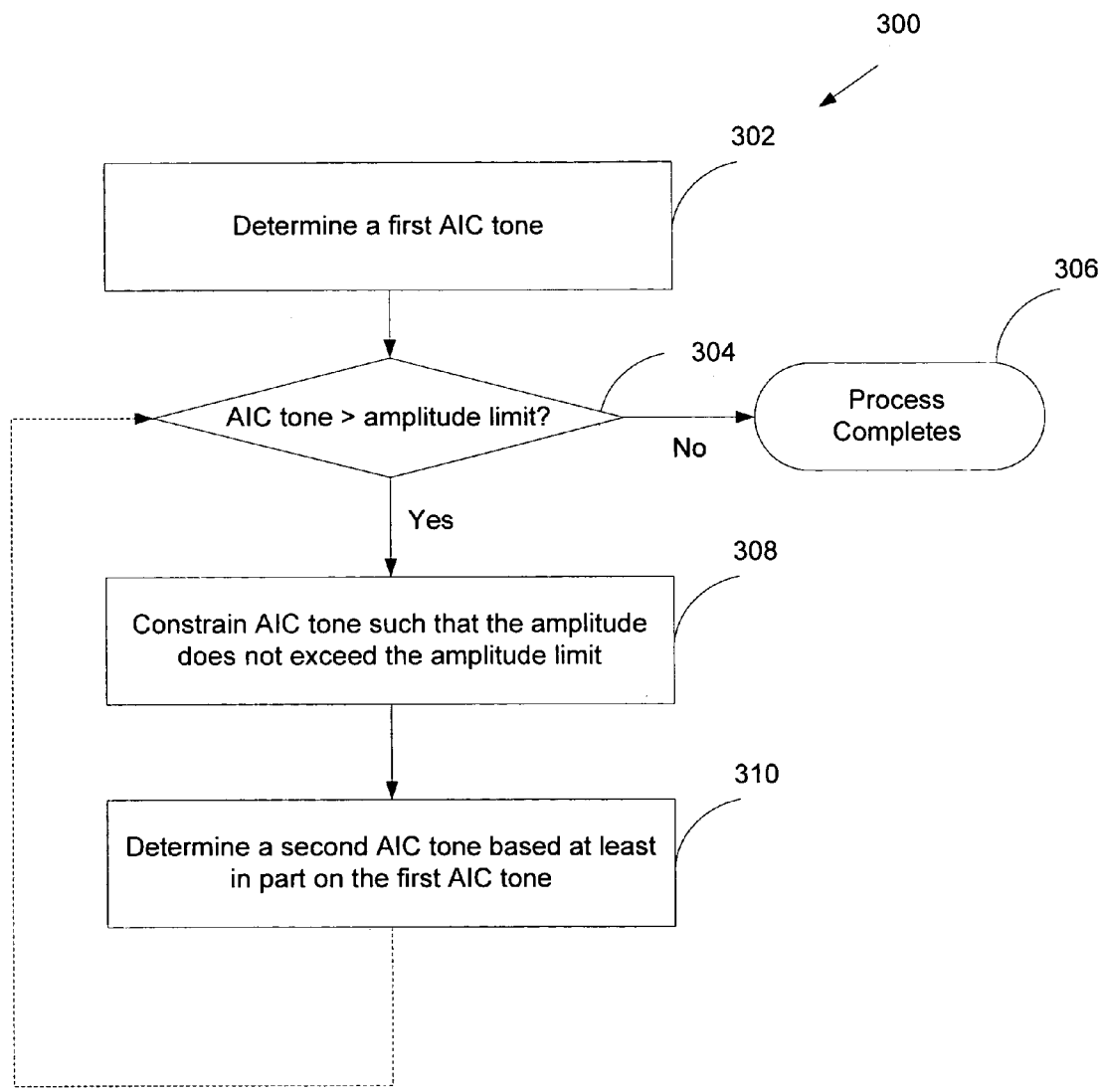
FIG. 3 is a flowchart illustrating an embodiment of a process for generating AIC tones.

FIG. 3 is a flowchart illustrating an embodiment of a process for generating AIC tones. Process 300 may be implemented on transmitter 200, specifically on AIC generator 210. In this example, process 300 begins when a first AIC tone is determined (302). A number of techniques for generating the first AIC tone are applicable, and several are discussed in more detail below. The location of the first AIC tone is determined, and the amplitude and phase of the first AIC tone are computed. The amplitude of the first AIC tone is compared to an amplitude limit (304). The amplitude limit may depend on the data tones being transmitted, a predetermined limit, or any other appropriate value. For example, an amplitude limit equal to the maximum amplitude of the data tones sent by the transmitter is used in some embodiments, and an amplitude limit of −41.3 dBM/MHz is used in some WiMedia UWB transmitter embodiments. If the amplitude of the first AIC tone is not greater than the amplitude limit, the residual tones are adequately compensated and the process completes (306).

If, however, the amplitude of the first AIC tone is greater than the amplitude limit, the AIC tone is constrained such that its amplitude does not exceed the amplitude limit (308). In some embodiments, constraining the AIC tone includes normalizing the AIC tone such that its amplitude equals the amplitude limit, while retaining the original phase of the tone. Here, an adjusted AIC tone will not adequately compensate the residual tones to meet the notch depth requirement. To further compensate the residual tones, a second AIC tone is determined based at least in part on the first AIC tone (310). This iterative process of 304-310 may be repeated until the AIC tones generated adequately compensate for the residual tones in the notch.

Figure 4:
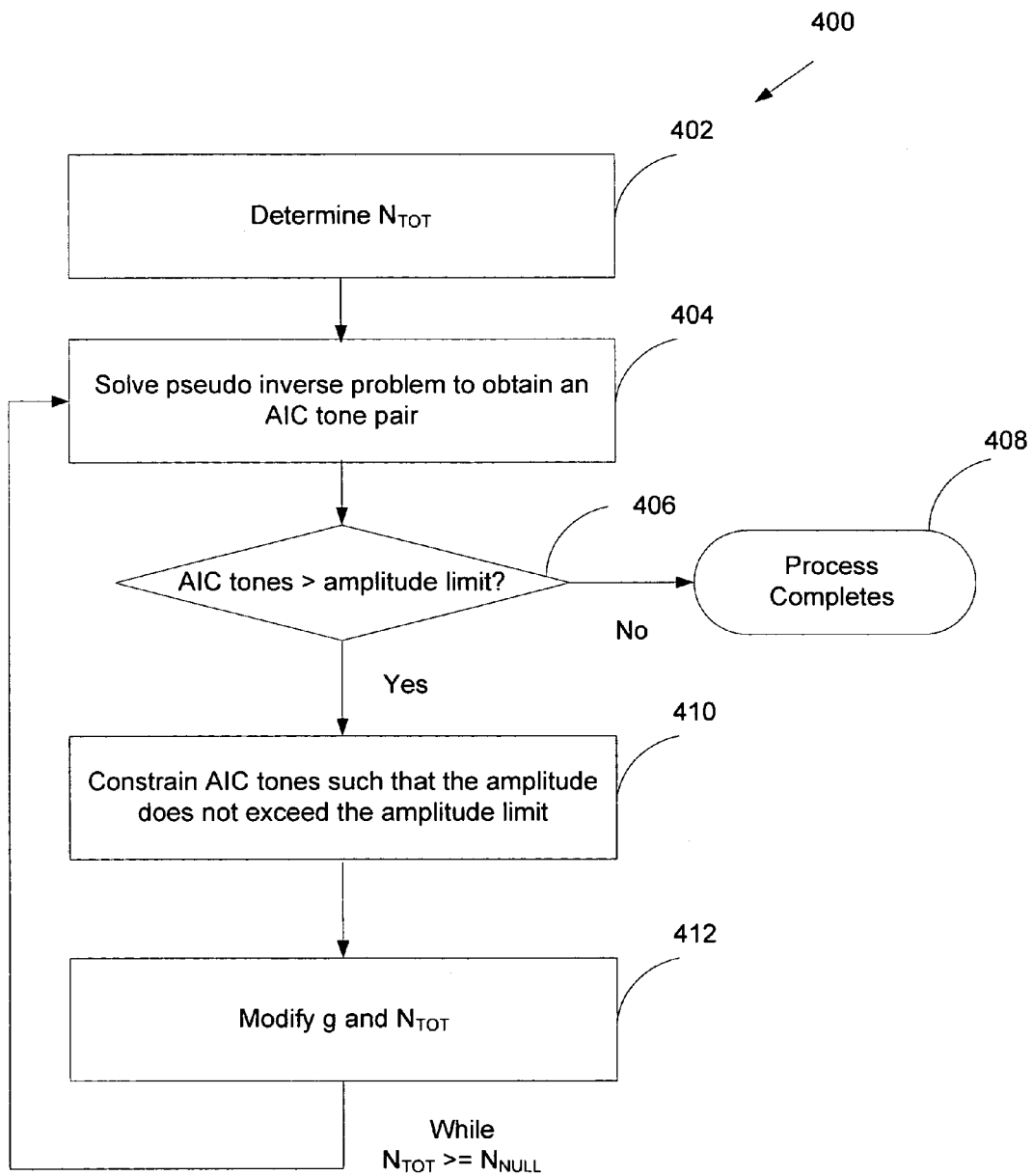
FIG. 4 is a flowchart illustrating another embodiment of a process for generating AIC tones.

FIG. 4 is a flowchart illustrating another embodiment of a process for generating AIC tones. In this example, process 400 initiates when the total number of tones used in the computation, $N_{TOT}$, is determined (402). $N_{TOT}$ is defined to be the sum of the number of tones to be nulled ($N_{NULL}$) and the number of AIC tones to be computed ($N_{AIC}$). In some embodiments, $N_{NULL}$ is determined by dividing the notch spectrum width by the frequency spacing between adjacent tones. $N_{AIC}$ is estimated based on the depth of the notch. In some embodiments, it is assumed that a first AIC tone pair provides approximately 20 dB of notch depth, and each additional tone pair provides approximately 10 dB increase in notch depth.

To determine the first AIC tone, a solution for a pseudo inverse problem based on $N_{TOT}$ and a tone vector g is determined (404). As used in this example, tone vector g is defined to be a vector having the same number of entries as tones in the frequency band. The entries in g correspond to the tones (amplitude and phase). Initially, the entries corresponding to the desired null tones and the potential AIC tones are set to zero. Details for determining solutions to the pseudo inverse problem are discussed below. Although the solution may contain amplitude and phase information for multiple AIC tone pairs, the outermost AIC tone pair (i.e., the AIC tone pair that is located to furthest away from the notch) is selected for further processing. The amplitudes of the outermost AIC tone pair are compared with an amplitude limit, in this case the maximum amplitude of the data tones to be transmitted (406). If neither of the AIC tones' amplitude exceeds the amplitude limit, the residual tones are adequately compensated by the outermost AIC tone pair and the process completes (408). If, however, either one of the AIC tones' amplitudes exceeds the amplitude limit, the AIC tones are constrained (410). Here, constraining the AIC tones involves normalizing the tones by multiplying them with a normalization factor chosen in such a way that the normalized amplitude of either of the AIC tones will not exceed the amplitude limit.

g and $N_{TOT}$ are modified accordingly (412). Specifically, in this example, the normalized AIC tones are inserted into appropriate locations in the vector. For example, since the outermost AIC tones were calculated, the zero values in the vector g that correspond to the outermost AIC tones are replaced with the normalized values. On subsequent iterations, zero values at the appropriate locations (corresponding to the current AIC tones being determined) in the vector g are replaced. $N_{TOT}$ is decremented by 2 since 2 of the AIC tones have been determined. 404-412 repeat until $N_{TOT}$ is less than $N_{NULL}$.

To solve the pseudo inverse problem, the following terms are defined in addition to vector g:

$$P(l,k) = \sum_{n=0}^{127} \exp\left(j2\pi \frac{n}{128}\left(k - \frac{1}{4}\right)\right)$$

is the Fourier Transform kernel with 4 times oversampling. The kernel defines the power contribution of each data tone to the notch frequencies. Because of the power contribution from the data tones, the achievable notch depth is limited. $P_1$ denotes the same kernel as it is applied to the AIC tones. The subscript of '1' is used to indicate that the kernel is used to map the power contributions of the AIC tones to the notch.

$d_1 = Pg$ is the data vector projected onto the transform kernel.

h is the vector of AIC tones constructed to cancel the contribution from the data tones to the notch frequencies.

Using these definitions, a least squares problem is defined below:

$$e^2 = \|P_1 h + d_1\|^2 \quad (1).$$

The goal is to solve for h such that the value of $e^2$ is minimized. The solution to this problem, which corresponds to the desired AIC tones, is given by the Moore-Penrose pseudo inverse. The pseudo inverse can be stated as follows:

$$h = -(P_1^T P_1)^{-1} P_1^T d_1 = -(P_1^T P_1)^{-1} P_1^T Pg \quad (2).$$

In some embodiments, the implementation of the calculation can be simplified by pre-computing and storing the pseudo inverse matrix $W_2$ where $$W_2 = -(P_1^T P_1)^{-1} P_1^T P \quad (3)$$

The pseudo inverse matrix $W_2$ is circulant, which means that each row vector of the matrix is a rotated version of the other row vectors. In some embodiments, for a given notch depth and a corresponding number of nulled tones, a single matrix $W_2$ is stored, rotated according to the location of the nulled tones, and multiplied with the tone vector g to determine the appropriate AIC tones. In some embodiments, separate matrices are pre-computed and stored for different notch widths.

Figure 5A:
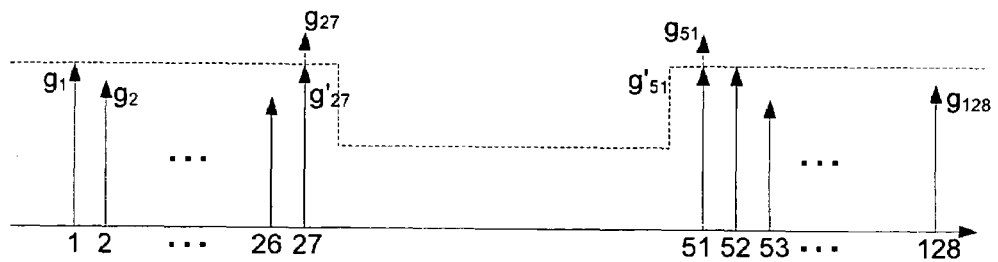
FIGS. 5A-5C are frequency spectrum diagrams illustrating an example of determining AIC tones based on an iterative procedure.
Figure 5B:
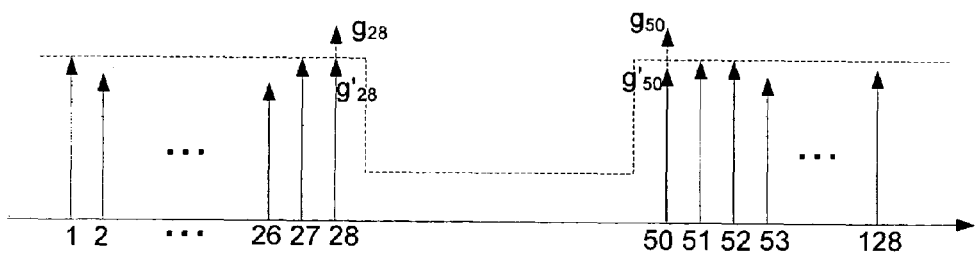
Figure 5C:
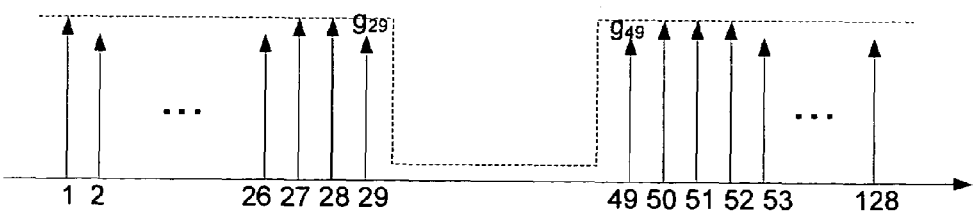

FIGS. 5A-5C are frequency spectrum diagrams illustrating an example of determining AIC tones based on an iterative procedure. In this example, there are 128 bins for 128 tones in the frequency band, numbered 1-128. The notch width requires 19 tones to be nulled, starting at bin 30. It is estimated that 3 pairs of AIC tones are required to provide approximately 40 dB of notch depth. Thus, $N_{null}=19$ and $N_{TOT}=25$ at the beginning.

The first iteration to determine the first AIC pair is executed with 25 null tones. Tone vector g is set to $[g_1, g_2, \ldots g_{26}, 0, 0, 0, \ldots, 0, g_{52}, g_{53}, \ldots g_{128}]$, where $g_i$ is the data tone at bin i. The solution may be obtained by directly solving the pseudo inverse problem, or by multiplying a precomputed pseudo inverse matrix $W_2$ that corresponds to 25 null tones at the desired location with the tone vector. The resulting frequency spectrum is illustrated in FIG. 5A. Since the resulting AIC pair $g_{27}$ and $g_{51}$ have amplitudes exceeding the amplitude limit equal to the maximum amplitude of the data tones, the AIC pair are normalized, and the normalized values are denoted as $g'_{27}$ and $g'_{51}$.

Similarly, the second iteration is executed with 23 tones, and the vector g is modified to be $[g_0, g_1, g_2, \ldots g'_{27}, 0, 0, \ldots, 0, g'_{51}, g_{52}, g_{53}, \ldots g_{128}]$. The resulting frequency spectrum is shown in FIG. 5B. The resulting AIC pair $g_{28}$ and $g_{50}$ exceed the amplitude limit and are normalized to $g'_{28}$ and $g'_{50}$. The third iteration is executed with 21 tones and g is modified to be $[g_0, g_1, g_2, \ldots g'_{27}, g'_{28}, 0, 0, \ldots, 0, \ldots, g'_{50}, g'_{51}, \ldots g_{128}]$. The resulting AIC pair $g_{29}$ and $g_{49}$ are not normalized since their amplitudes are less than the amplitude limit. The frequency spectrum is shown in FIG. 5C. As shown in the figures, the depth of the notch increases with each iteration, while the width of the notch decreases for each iteration. In the end, more than 40 dB of attenuation is achieved for the desired notch width.

Figure 6:
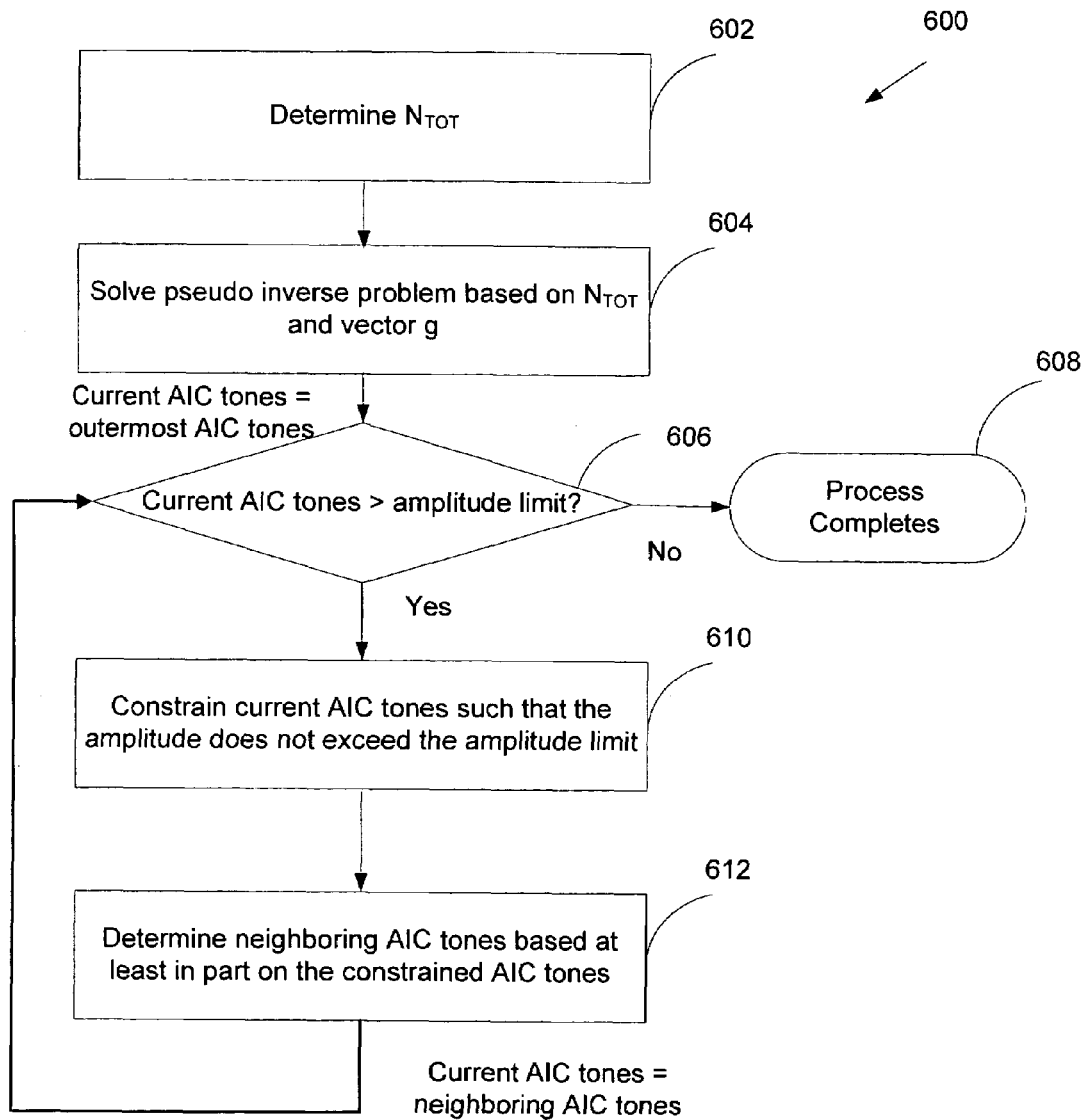
FIG. 6 is a flowchart illustrating another embodiment of a process for generating AIC tones.

In some embodiments, the computation of the AIC tones is simplified based on known characteristics such as the characteristics of the window function used to limit the symbol data. FIG. 6 is a flowchart illustrating another embodiment of a process for generating AIC tones. In this example, process 600 initiates when the total number of tones used in the computation, $N_{TOT}$, is determined (602). A solution to the pseudo inverse problem based on $N_{TOT}$ and a vector g is determined (604). Here, $N_{TOT}$ and the solution to the pseudo inverse problem are determined in ways similar to what was described above.

Prior to steps 606, the current AIC tones are set to be the outermost AIC tones according to the solution to the pseudo inverse problem. The amplitudes of the current AIC tones are compared to an amplitude limit (606). If neither of the current AIC tones' amplitudes exceeds the amplitude limit, the residual tones are adequately compensated by the current AIC tone pair and the process completes (608). If, however, either of the current AIC tones' amplitudes exceeds the amplitude limit, the current AIC tones are constrained (610). The constrained AIC tones contribute power to residual tones within the notch. Accordingly, two neighboring AIC tones adjacent to the current AIC tones are determined to compensate for the residual tones resulting from the constrained AIC tone (612). Setting the current AIC tones to the newly computed neighboring AIC tones, 606-612 are repeated until an un-normalized AIC tone pair that does not exceed the amplitude limit is found.

In some embodiments, each of the neighboring AIC tones is determined based on a normalization factor $C_{norm}$. To illustrate the derivation of the normalization factor, it is first assumed that the pseudo inverse problem yields a real valued AIC tone (e.g. in FIG. 5A, AIC tone $g'_{27}$ is real and has no imaginary component). In this example, the sidelobes from a single finite length tone decay is described by sinc(f) in the frequency domain (sinc(f) is defined as $\sin(\pi f)/\pi f$). The un-normalized AIC tone has an amplitude of A. Its frequency response is denoted as A·sinc(f). The un-normalized AIC provides the optimal attenuation over the desired notch frequencies.

Normalization causes the amplitude of the AIC tone to decrease from A to a smaller value B. The frequency response of the normalized tone is given by B·sinc(f), which provides less than the optimum amount of attenuation over the desired notch frequencies. As such, the notch depth decreases by (A−B)·sinc(f). In other words, it is possible to compute how much sidelobe mitigation has been lost due to the normalization.

Figure 7:
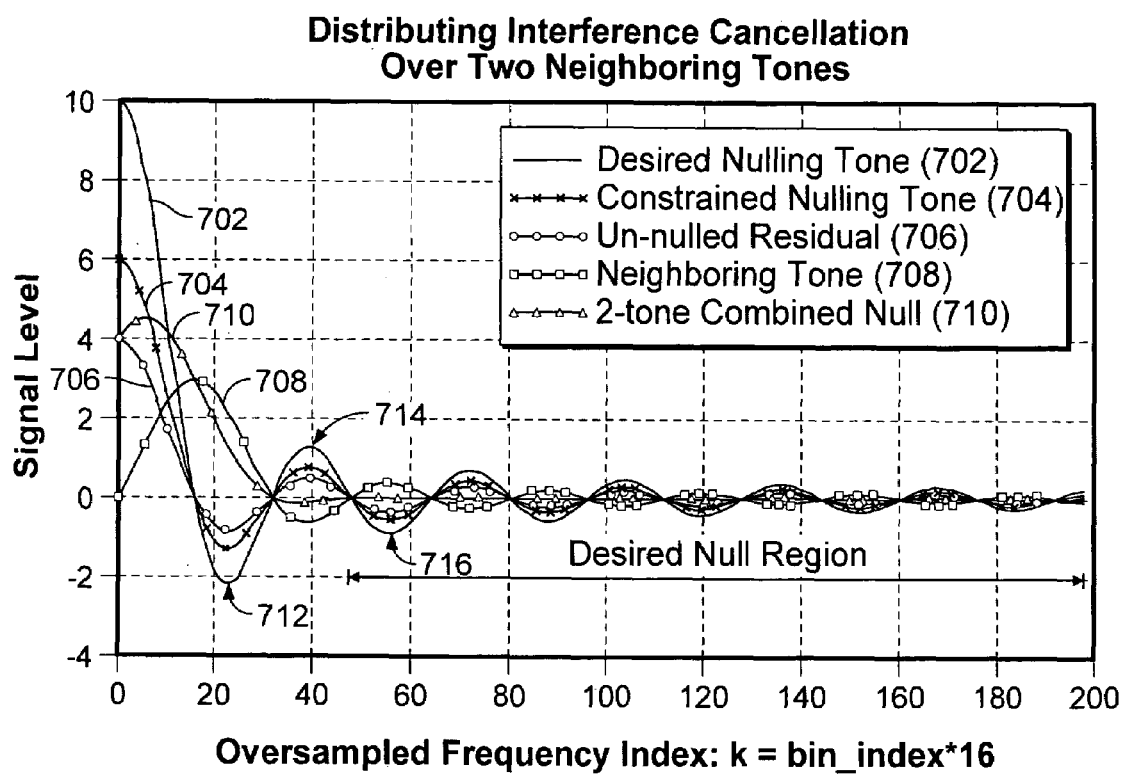
FIG. 7 is a diagram illustrating an example of real value frequency domain responses.

FIG. 7 is a diagram illustrating an example of real value frequency domain responses. In this example, the signals are 16 times over sampled. The x-axis corresponds to the index of the samples. As shown, each frequency bin includes 16 samples. The y-axis corresponds to the signal level. For tones 702-710, zeros occur every $16^{th}$ samples, and so do the peaks. The peaks occur where the derivatives of the signal is approximately 0. For example, in tone 702, the peaks are located at 712, 714, 716, etc. In embodiments where different window function is used, the values and locations of the peaks vary accordingly.

Tone 702 is the desired AIC tone that can be used to null all the residual signals. It corresponds to the frequency spectrum of A·sinc(f), where A=10. In this case, the amplitude limit is set to B=6. Thus, tone 702 needs to be constrained, resulting in tone 704. The constrained spectrum corresponding to tone 704 is B·sinc(f). Signal 706, the signal resulting from the application of the amplitude constraint on the original AIC tone 702, corresponds to the residual signal (A−B)·sin c(f). The first peak of the sinc function is defined to have a value of 1 and the rest of the relative peak values are pre-computed and stored in a vector Peak=[−0.2172, 0.1281, −0.0908, 0.0704, −0.0574, 0.0485, −0.0420, 0.0370, −0.0331, 0.0299, −0.0273, ... ]. Approximations of the peak values are used in some embodiments. In the example shown, the peaks of the residual signal are located every $16^{th}$ samples apart.

To compensate for the residual signals, an additional AIC tone signal 708 is placed in the neighboring bin, with center frequency at k=16 in the figure. The peaks of the additional AIC tone are offset by one half-cycle compared to both the peaks of the original AIC tone and the peaks of the residual signal. The additional AIC tone is generated to negate the peaks of the residual signal. For example, to negate only the first residual peak at k=39, an additional AIC tone that is a sinc function with an amplitude of (B−A)·(0.1281/0.2172) is generated. To negate the first two residual peaks at k=39 and k=55, a sinc function with an amplitude of (B−A)·((0.1281+0.0908)/(0.2172+0.1281)) is used. More generally, the normalization factor used to determine the amplitude of the sinc function is the following:

$$C_{norm} = (B - A) \cdot \frac{\frac{1}{num\_len - 1} \sum_{n=2}^{num\_len} |Peak(n)|}{\frac{1}{num\_len} \sum_{n=1}^{num\_len} |Peak(n)|}, \quad (4)$$

where num_len=(number of null tones desired)/2, rounded up for odd number of null tones, n=the peak number for the sinc function, and Peak(n)=the relative value of the sinc function at peak n. The multiplier $$\frac{\frac{1}{num\_len - 1} \sum_{n=2}^{num\_len} |Peak(n)|}{\frac{1}{num\_len} \sum_{n=1}^{num\_len} |Peak(n)|}$$

converges rather quickly, and is approximated using a convergent value substantially between 0.8-0.84 in some embodiments. In the example shown, the notch under consideration starts at n=2. In some embodiments, the notch may start further away (e.g., at n=4, 6, etc.)

In the example shown, the first 11 peaks are taken into account, and the neighboring tone level is given by $C_{norm}$=0.0564/0.0754*(10−6)=2.992. This tone is tone 708. Tone 708 is smaller in amplitude than the amplitude limit of 6, thus no further iteration is needed. Had tone 708 been greater than the amplitude limit, one or more iterations may be required until an un-normalized AIC tone is within the amplitude limit. In the diagram, tone 710 shows the residual signal level after two neighboring AIC tones (704 and 708) are used to null the data tones. Tone 710 has some energy between AIC tones 704 and 708, but goes to approximately zero within the desired null region.

In general, the solution to the pseudo inverse problem is complex, thus the resulting AIC tones are complex. Complex AIC tones, denoted by a phase $\phi$ and an amplitude A, are used to cancel the cumulative sidelobes from other data tones. Consider a complex phasor $a_1+ib_1$ at discrete frequency $k_0$. In the frequency domain, this tone is represented by:

$$H_1(k) = A_1 \cdot e^{i\phi} \delta(k-k_0) \quad (5),$$

where $A_1 = \sqrt{a_1^2 + b_1^2}$ and $\phi = \tan^{-1}(b_1/a_1)$, k is the over-sampled frequency domain variable, and $\delta$ is the dirac delta function. This delta function representation in frequency, corresponds to a infinitely long time series given by $$h_1[n] = A_1 \sin(2\pi k_0 n + \phi) \quad (6).$$

In practice, however, the OFDM symbol is finite in time. The finite time series may be represented by multiplying the infinite time series by a window function, such as a rectangular window, a Hamming window, a Hanning window, a Kaiser-Bessel window, a Blackman window, a raised cosine window, etc. For purposes of illustration, a rectangular window function of length $N_\Delta$ in the time domain having a sinc transform function in the frequency domain is described in the example below. Accordingly, the finite time series is represented as:

$$h_2[n] = A_1 \sin(2\pi k_0 n + \phi) \cdot \prod \left( \frac{n - n_0}{N\Delta} \right), \quad (7)$$

where $$\prod \left(\frac{n - n_0}{N_\Delta}\right)$$

indicates a rectangular window of magnitude 1, width $N_\Delta$ and center $n_0$. Based on the multiplicative property of the Fourier Transform, the time-domain multiplication corresponds to a frequency domain convolution of Equation 5 with the sinc function. Accordingly, the frequency domain representation of the finite time series of length $N_\Delta$ is given by:

$$H_2(k) = A_1 e^{i\phi} e^{-i2\pi \frac{(k-k_0)}{N} n_0} sinc\left(\frac{(k-k_0)}{N} \cdot N_\Delta\right). \quad (8)$$

Returning to the problem of determining complex AIC tones, we begin with a solution to the AIC problem given by $a_1+ib_1$ at discrete frequency $k_1$, with amplitude $A_1=\sqrt{a_1^2+b_1^2}$ and $\phi_1=\tan^{-1}(b_1/a_1)$. In the event that $A_1$ is greater than the amplitude limit, in this case the maximum power of the other tones in the OFDM symbol, the solution is constrained by setting the tone level at $k_1$ to $A_2=\sqrt{a_2^2+b_2^2}$, where both real and imaginary components are normalized by the same value such that the phase is retained. In other words, $\phi_2=\tan^{-1}(b_2/a_2)=\phi_1$. This constraint leaves a residual frequency response of $$(A_1 - A_2) e^{i\phi_1} e^{-i2\pi \frac{(k-k_1)}{N} N_\Delta n_0} sinc\left(\frac{(k-k_1)}{N} \cdot N_\Delta\right). \quad (9)$$

In some embodiments, such as in systems operating under the WiMedia standard, $N_\Delta=128$ and $n_0=64$. To correct for this residual, a neighboring tone $k_2$ with amplitude given by $C_{norm}$ in Equation 4 is selected, where $A_1$ replaces A and $A_2$ replaces B. Further, the real and imaginary components are selected such that the phase, $\phi_1$, is retained, but shifted to the frequency $k_2$. Specifically, a complex tone at frequency $k_2$ given by $a_{norm}+ib_{nom}$ is selected, where $a_{norm}$ and $b_{norm}$ are determined as follows:

$$a_{norm} = C_{norm} \Re(e^{i(\phi_1 + 2\pi(k_2-k_1)n_0 N_\Delta/N)}),$$

$$b_{norm} = C_{norm} \Im(e^{i(\phi_1 + 2\pi(k_2-k_1)n_0 N_\Delta/N)}) \quad (10)$$

where $\Re$ and $\Im$ stand for real and imaginary parts respectively. The frequency offset $(k_2-k_1)$ is small enough to be ignored in some embodiments.

Figure 8:
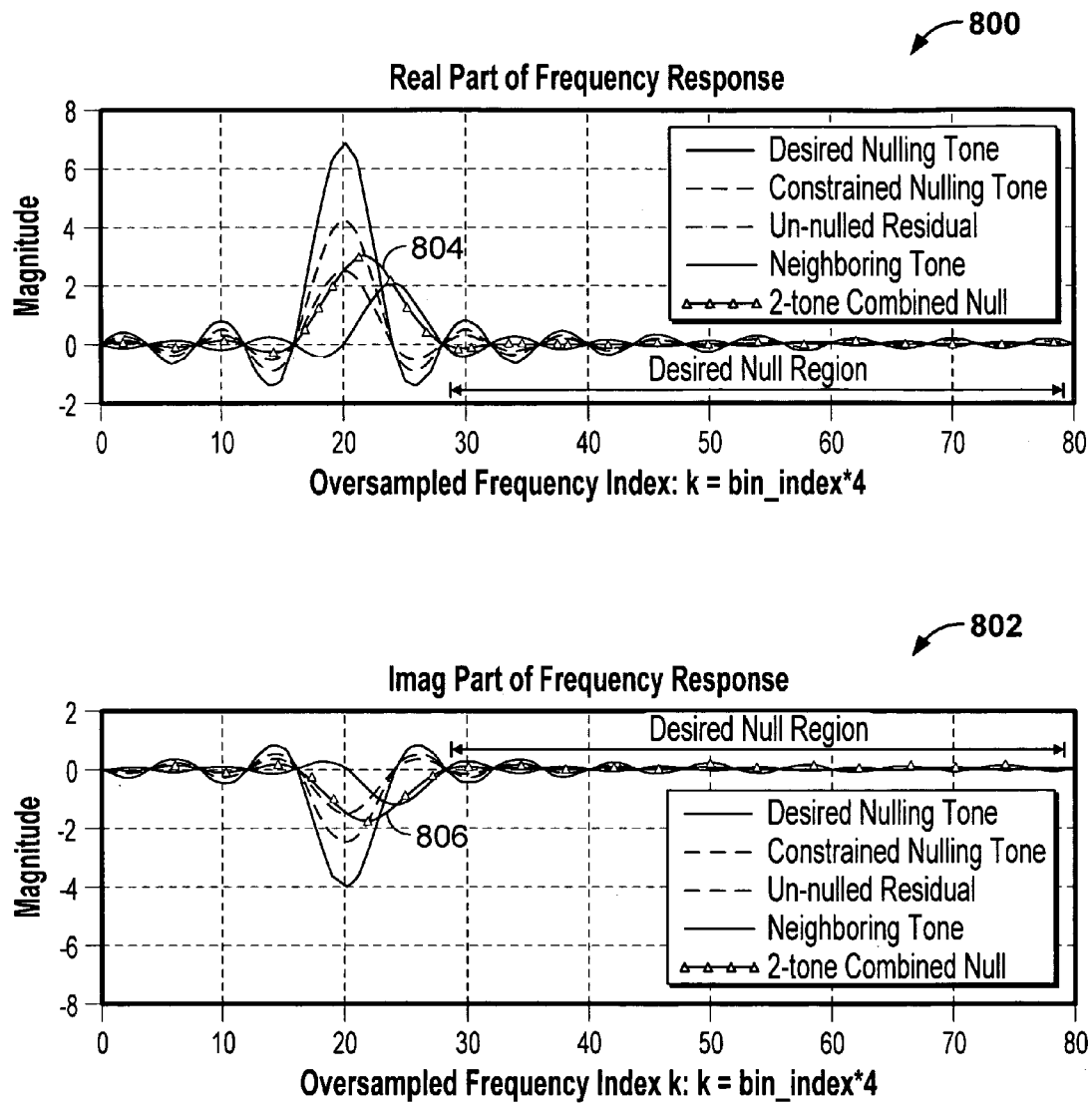
FIG. 8 shows frequency diagrams illustrating an example in which complex AIC tones are generated to cancel both real and imaginary residual tones.

FIG. 8 shows frequency diagrams illustrating an example in which complex AIC tones are generated to cancel both real and imaginary residual tones. In the example shown, $A_1=8$, $A_2=5$, and $\phi_1=-\pi/6$. The resulting $C_{norm}=0.0076/0.0094 \cdot (8-5)=2.4$. The corresponding complex values are $a_{norm}=2.1230$, $b_{norm}=-1.2257$. Diagram 800 illustrates the real part of the frequency response and Diagram 802 illustrates the imaginary part of the frequency response. As shown by tones 804 and 806 in the diagrams, this complex phasor cancels both real and imaginary spectra as desired.

In some embodiments, the first AIC tone pair is determined without solving the pseudo inverse problem. Rather, the AIC tones are computed based on the weighted values of the peaks of the sinc function from data tones. A predetermined number of peak values are stored in memory as a vector Peak. In the example shown, Peak has 128 values [−0.2172, 0.1281, −0.0908, 0.0704, −0.0574, 0.0485, −0.0420, 0.0370, −0.0331, 0.0299, −0.0273, . . . ], although Peak having other lengths or other values are used in some embodiments. To compute the AIC tone values, for a given notch location, the sum of all complex data tones times the sinc peak value corresponding to the difference between the null location and the data location is computed. The complex sum is weighed using $C_{norm}$ of Equation 4 to generate the value for the AIC tone.

To determine a pair of AIC tones, the first AIC tone on the left side of the notch is computed as follows:

$$AIC_{first} = -\left[\sum_{n=1}^{null(1)-1} g(n) \cdot \text{Peak}(null(1) - n) + \sum_{m=null(null\_len)+1}^{128} g(m) \cdot \text{Peak}(m - null(null\_len) + null\_len - 1)\right], \quad (11)$$

where null is a vector containing the indices of all nulled tones, null_len is the length of the null vector, Peak is the stored vector containing the sinc peaks from 1 through the $128^{th}$ peak, and g is the data vector.

The last AIC tone on the right side of the notch is computed as: follows:

$$AIC_{last} = -\left[\sum_{n=1}^{null(1)-1} g(n) \cdot \text{Peak}(null(null\_len) - n) + \sum_{m=null(null\_len)+1}^{128} g(m) \cdot \text{Peak}(m - null(null\_len))\right]. \quad (12)$$

Returning to FIGS. 5A-5C for an example. The first pair of AIC tones to be computed are $g_{27}$ and $g_{51}$. Equation 11 is used to compute $g_{27}$, where null=[27 28 29 30 . . . 49 50 51], null(1)=27, and null_len=25. Equation 12 is used to compute $g_{51}$, where null(null_len)=51.

If $g_{27}$ or $g_{51}$ exceeds the amplitude limit, the amplitudes of the AIC tones are constrained by multiplying with $C_{norm}$ to obtain normalized AIC tones $g'_{27}$ and $g'_{51}$. The next pair of AIC tones $g_{28}$ and $g_{50}$ are computed iteratively using equations 11 and 12, where null=[28 29 30 . . . 49 50], null(1)=28, null_len=23, null(23)=50. The computation is dependent at least in part on the normalized AIC tones since $g(27)=g'_{27}$ and $g(51)=g'_{51}$. The process repeats until $g_{29}$ and $g_{49}$, which do not exceed the amplitude limit, are determined.

Generating a notch in an OFDM frequency spectrum has been disclosed. The iterative technique described reduces computational complexity for computing AIC tones. FIG. 9 is a table illustrating the complexity estimates for various approaches to computing the AIC tones. Unlike the traditional method of full matrix computation, which requires a number of multiplication for each additional pair of AIC tones proportional to n, where n is the number of tones to be nulled, the iterative technique only requires a constant number of multiplications. For example, by approximating the multiplier in Equation 4 with a constant, the incremental complexity of computing an additional pair of AIC tones involves two multiplications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating a notch in an Orthogonal Frequency Division Multiplexing (OFDM) frequency spectrum, comprising:
    determining a first active interference cancellation (AIC) tone;
    comparing, using a processing component, the first AIC tone with an amplitude limit;
    in the event that the first AIC tone exceeds the amplitude limit, constraining the first AIC tone, and determining a second AIC tone based at least in part on the first AIC tone;
    wherein the first AIC tone is determined based at least in part on a plurality of peak values of a transform function.

2. A method as recited in claim 1, wherein the transform function is a transform function of a window function.

3. A method as recited in claim 1, wherein the first AIC tone is determined based at least in part on a plurality of data tones.

4. A method as recited in claim 1, wherein the second AIC tone is determined based at least in part on the plurality of peak values of the transform function.

5. A method as recited in claim 1, wherein a current AIC tone is used as the second AIC tone, and the method further comprises:
    a) comparing the current AIC tone with the amplitude limit; and
    b) in the event that the current AIC tone exceeds the amplitude limit, constraining the current AIC tone, obtaining a next AIC tone to be determined, and setting the current AIC tone to be the next AIC tone.

6. A method as recited in claim 5, further comprising repeating a)-b).

7. A method as recited in claim 1, wherein constraining the first AIC tone includes multiplying the AIC tone with a normalization factor.

8. A method as recited in claim 1, wherein constraining the first AIC tone includes multiplying the AIC tone with a normalization factor Cnorm, and $$C_{norm} = (A_2 - A_1) \cdot \frac{\frac{1}{num\_len - 1} \sum_{n=2}^{num\_len} |Peak(n)|}{\frac{1}{num\_len} \sum_{n=1}^{num\_len} |Peak(n)|},$$

wherein
    $A_1$ corresponds to an amplitude of the AIC tone, $A_2$ corresponds to a constrained tone level, num_len corresponds to (number of null tones desired)/2, rounded up for odd number of null tones, n corresponds to the peak number for the sinc function, and Peak(n) corresponds to the relative value of the sinc function at peak n.

9. A method as recited in claim 1, wherein constraining the first AIC tone includes multiplying the AIC tone with a normalization factor Cnorm that is set to a convergent value substantially between 0.8-0.84.

10. An Active Interference Cancellation (AIC) tone generator, comprising:
    an interface configured to receive a plurality of tones;
    a processing component coupled to the interface, configured to:
        determine a first AIC tone;
        compare the first AIC tone with an amplitude limit; and
        in the event that the first AIC tone exceeds the amplitude limit, constrain the first AIC tone, and determine a second AIC tone based at least in part on the first AIC tone;
        wherein the first AIC tone is determined based at least in part on a plurality of peak values of a transform function.

11. An AIC tone generator as recited in claim 10, wherein the transform function is a transform function of a window function.

12. An AIC tone generator as recited in claim 10, wherein the first AIC tone is further determined based at least in part on a plurality of data tones.

13. An AIC tone generator as recited in claim 10, wherein the second AIC tone is further determined based at least in part on the plurality of peak values of the transform function.

14. An Orthogonal Frequency Division Multiplexing (OFDM) transmitter comprising:
    a tone controller configured to turn off one or more data tones in a frequency band;
    an active interference cancellation (AIC) tone generator coupled to the tone controller, configured to:
        determine a first AIC tone;
        compare the first AIC tone with an amplitude limit; and
        in the event that the first AIC tone exceeds the amplitude limit, constrain the first AIC tone, and determine a second AIC tone based at least in part on the first AIC tone;
        wherein the first AIC tone is determined based at least in part on a plurality of peak values of a transform function.

15. An OFDM transmitter as recited in claim 14, wherein the transform function is a transform function of a window function.

16. An OFDM transmitter as recited in claim 14, wherein the first AIC tone is further determined based at least in part on a plurality of data tones.

17. An OFDM transmitter as recited in claim 14, wherein the second AIC tone is further determined based at least in part on the plurality of peak values of the transform function.

* * * * *